March 17, 1936.    A. G. BUTLER    2,034,083

LANDING GEAR

Filed Dec. 19, 1934

INVENTOR.
ARTHUR G. BUTLER.
BY
ATTORNEYS.

Patented Mar. 17, 1936

2,034,083

UNITED STATES PATENT OFFICE 2,034,083

LANDING GEAR

Arthur G. Butler, Eggertsville, N. Y., assignor to Curtiss Aeroplane & Motor Company, Inc., a corporation of New York Application December 19, 1934, Serial No. 758,167

7 Claims. (Cl. 244—2)

This invention relates to aircraft landing gears, and is particularly concerned with improvements in tail wheel and arresting hook mountings for that type of aircraft which is adapted to land upon ship decks and other restricted spaces.

The conventional form of landing gear for shipboard aircraft comprises a main forward landing gear and a tail wheel at the rear end of the fuselage. An arresting hook having a long shank has been hinged to the bottom of the fuselage, means being provided to lower the hook below the body of the fuselage to engage cables on the deck. In these previous forms of arresting hook arrangements, the depending hook is well forward of the rear of the aircraft, whereby a sufficient moment is not exerted to hold the tail down and to prevent it from bouncing. Certain improvements in arresting hooks have provided for housing the hook in the aircraft fuselage and extending it rearwardly therefrom to a depending position at the extreme rear end of the fuselage. This invention comprises improvements in arresting hook and tail wheel installations of the latter type.

An object of the invention is to coordinate an arresting hook and tail wheel mounting so that a minimum of space is required for the mechanisms of each.

A further object is to so arrange an arresting hook and tail wheel mounting so that the rear end of an aircraft fuselage may be materially reduced in height.

Still another object is to provide a dual shock absorbing arrangement for an aircraft tail wheel.

Another object is to arrange the rear landing gear of an aircraft in such relation to the aircraft fuselage that the latter is aerodynamically clean, permitting of a reduction in the overall height of the fin and rudder by which the aircraft may be stowed more readily on the deck of an aircraft carrier.

A further object is to so arrange a tail wheel mounting and a retractable arresting hook installation so that there is no chance of the two becoming fouled with one another.

Further objects, and a better understanding of the details of the invention, may be appreciated by reading the annexed specification and claims, and in viewing the drawing, in which:

Figure 1:
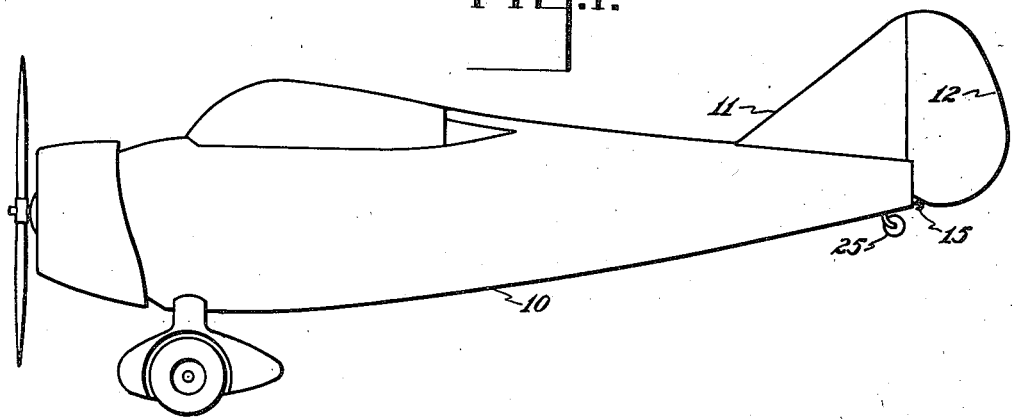
Fig. 1 is a side elevation of an airplane embodying the device of this invention.
Figure 2:
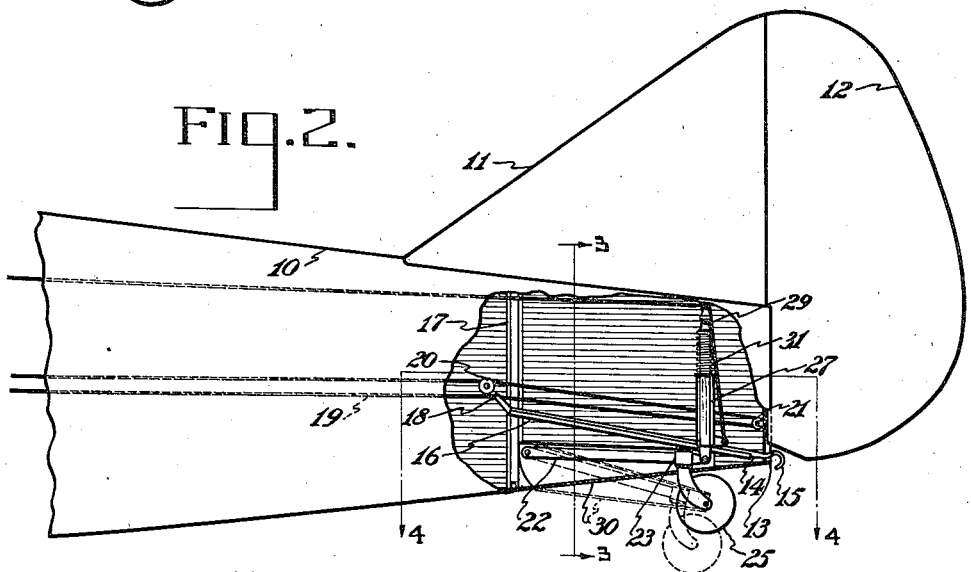
Fig. 2 is an enlarged side elevation of the tail portion of the airplane, partly broken away, to show the tail wheel and arresting hook mounting.
Figure 3:
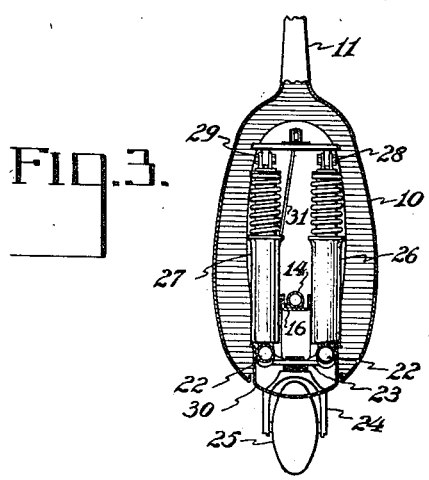
Fig. 3 is a section on the line 3—3 of Fig. 2.
Figure 4:
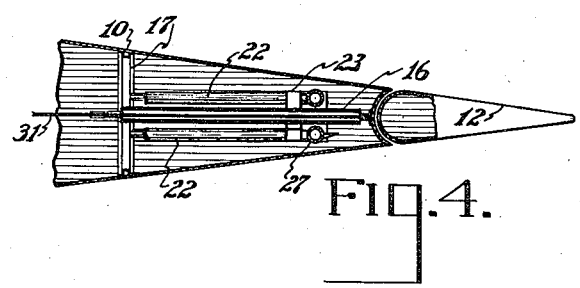
Fig. 4 is a section on the line 4—4 of Fig. 2.

An aircraft fuselage 10, carrying the usual forward landing gear, wings and power plant, is provided with a vertical fin 11 to which a rudder 12 is hinged, the rudder continuing downwardly to form a continuation of the rearward edge of the fuselage. The rear lower corner of the fuselage 10 is provided with an opening 13 through which the shank 14 of an arresting hook may pass, said shank having a hook 15 at its rear end which may at all times project rearwardly of the fuselage. Within the fuselage, a channel 16 is mounted, its forward end being attached to a bulkhead 17, and its rearward end being attached adjacent the rear of the fuselage. The shank 14 is adapted to lie in the channel, as shown in Fig. 3, when the hook assembly is retracted. The forward end of the shank carries a fitting 18 to which a cable 19 is connected, said cable passing over pulleys 20 and 21 and forward to a suitable operating mechanism in the pilot's cockpit. The channel and hook lie in the fuselage plane of symmetry. Translation of the cable 19 will cause extension or retraction of the arresting hook assembly according to the direction in which it is moved. When extended, the fitting 18 lies close to the pulley 21, and the shank 14 is wholly projected rearwardly and downwardly from the bottom rearward corner of the fuselage.

By the low position of the channel 16, which receives the arresting hook, it will be seen that the normal tail wheel organization of the prior art could not readily be installed, unless such tail wheel installation were advanced well forward of the bulkhead 17. This would be undesirable. Consequently, the tail wheel mounting comprises a pair of rearwardly extending struts 22, pivoted to the bulkhead 17, and carrying a cross yoke 23 bridging their rearward ends. The yoke 23 carries a swiveling tail wheel fork 24 in which a wheel 25 is mounted. The wheel, yoke and struts are thus vertically oscillatable, and to sustain the weight of the rearward end of the airplane, substantially vertical shock absorber struts 26 and 27 are provided. These struts are arranged in parallel relationship, one on each side of the channel 16, and are pivoted at their upper ends, as at 28 and 29, to a fixed element of the fuselage. The struts 26 and 27 are similar in construction and may each be designed for a load of substantially half of the amount for which a single shock absorber strut in the same service would be designed, since the load is divided substantially equally between the two struts.

To minimize unnecessary drag of the tail wheel mounting, a sheet metal fairing 30 is carried by the struts 22, and a cable 31, attached adjacent the yoke 23, runs to a pulley near the strut pivots 28 and 29, and thence forwardly to a suitable control in the pilot's cockpit. When in flight, the cable 31 may be drawn up, to effect a flush relationship between the outer surface of the fairing 30 and the outer contour of the fuselage. Preparatory to landing, the cable may be relaxed, whereby the tail wheel drops to a landing position slightly below the fuselage.

In any position of the tail wheel mechanism, there is no interference with the arresting hook and its associated parts, whether said hook be extended or retracted. Likewise, the complete organization is symmetrical with respect to the plane of symmetry of the fuselage. By virtue of the arresting hook being located low in the fuselage, the shank 14 may be made substantially shorter than if it were mounted in the usual elevated position. Likewise, since the hook issues from the lower rearward corner of the fuselage, a part of the rudder 12 may be formed as a rearward continuation of the fuselage, instead of terminating toward the upper edge thereof, by which arrangement the overall height of the rudder from the ground line is substantially reduced.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an aircraft fuselage, in combination, a tail chassis construction comprising a cross yoke, a tail wheel carried thereby, laterally spaced shock absorbing devices connecting the outer ends of said yoke with said aircraft, a retractable arresting hook, and means for retracting said hook to a position within said fuselage and between said spaced shock absorbing devices, and for extending said hook beyond the rearward end of said fuselage.

2. In an aircraft fuselage, in combination, a retractable arresting hook adapted to be moved in the aircraft plane of symmetry from a retracted position within the fuselage to an extended position beyond the rear of said fuselage, and a bifurcated tail wheel support between the bifurcations of which said arresting hook lies when retracted.

3. A landing gear construction for an aircraft fuselage having longitudinally spaced bulkheads, of a channel extending in the aircraft plane of symmetry between said bulkheads, a retractable arresting hook arranged when retracted to lie in said channel, a tail wheel, and a pair of members embracing said channel for supporting said tail wheel.

4. A landing gear construction for an aircraft fuselage having a transverse bulkhead forward of the rearward end thereof, comprising a substantially horizontally disposed member pivoted to said bulkhead for vertical oscillation, a tail wheel carried thereby and extendible below said fuselage, a pair of substantially vertically extending shock absorber struts, laterally spaced from each other, pivoted to said member and to said fuselage, an arresting hook movable from a retracted position between said shock absorber struts to an extended position rearward of said fuselage, and means for moving said hook lying at all times between said struts.

5. Means for reducing the height of an aircraft fuselage having a tail wheel and an arresting hook extendible downwardly and rearwardly from said empennage, comprising a tail wheel support adjacent and substantially parallel to the lower run of said fuselage, and pivoted thereto, laterally spaced substantially vertical struts joining said support with said fuselage, and an arresting hook passing, when retracted, between said vertical struts.

6. In an aircraft fuselage, in combination, a retractable arresting hook issuing from the extreme rearward lower corner of said fuselage, means for extending said hook to a position rearward of and below said corner and for retracting said hook within said fuselage to a position close to the lower surface thereof, a tail wheel support below said hook, and a pair of spaced struts extending upwardly from said support, one being positioned on each side of said arresting hook.

7. In an aircraft fuselage, in combination, an arresting hook retractable to a position within said fuselage and in the plane of symmetry thereof, a tail wheel assembly below said retracted hook having brace struts embracing said retracting hook, and means for moving said hook wholly rearwardly of said tail wheel assembly.

ARTHUR G. BUTLER.